United States Patent [19]

Saeki et al.

[11] 4,426,484

[45] Jan. 17, 1984

[54] METHOD FOR ACCELERATING CURE OF RESOLE TYPE PHENOLIC RESINS

[75] Inventors: Yukio Saeki; Katsuyuki Tanaka, both of Fujieda, Japan

[73] Assignee: Sumitomo Durez Company, Ltd., Tokyo, Japan

[21] Appl. No.: 311,375

[22] Filed: Oct. 14, 1981

[30] Foreign Application Priority Data

Oct. 21, 1980 [JP] Japan ................... 55-146339

[51] Int. Cl.³ ............... C08L 61/10; C08L 61/12; C08L 61/14

[52] U.S. Cl. .................... 524/541; 523/143; 523/145; 524/442; 525/501; 528/155

[58] Field of Search ............ 525/501; 528/155; 523/143, 145; 524/541

[56] References Cited

U.S. PATENT DOCUMENTS

| | | | |
|---|---|---|---|
| 2,478,943 | 8/1949 | Rhodes | 528/155 X |
| 2,524,079 | 10/1950 | Rhodes | 528/155 X |
| 2,952,040 | 9/1960 | Phillips | 525/501 X |
| 3,944,514 | 3/1976 | Nishiyama et al. | 525/501 X |
| 4,055,528 | 10/1977 | Kim | 528/165 X |
| 4,089,837 | 5/1978 | Luttinger et al. | 524/442 X |
| 4,251,408 | 2/1981 | Hesse et al. | 525/501 X |
| 4,252,700 | 2/1981 | Funabiki et al. | 525/501 X |
| 4,317,896 | 3/1982 | Holik | 525/501 |
| 4,345,054 | 8/1982 | Takeda et al. | 525/442 X |

FOREIGN PATENT DOCUMENTS 726462  11/1956  United Kingdom .

*Primary Examiner*—Howard E. Schain
*Attorney, Agent, or Firm*—James F. Tao; James F. Mudd

[57] ABSTRACT

The cure of resin compositions comprising a mixture of a resole type phenol aldehyde resin and a novolac type phenol formaldehyde resin is improved by employing resorcinol as all or part of the phenolic component in the novolac type resin. The resin compositions are particularly useful as binders for foundry sand.

7 Claims, 1 Drawing Figure

METHOD FOR ACCELERATING CURE OF RESOLE TYPE PHENOLIC RESINS

BACKGROUND OF THE INVENTION

Phenolic resins are used in various fields as binders of either organic or inorganic substances because they are excellent in their performance and working ability. Typical instances are foundry binders such as used for coating phenolic resins onto sand particles, and the binder for molding material, for incorporating fillers such as wood flour, pulp, glass fiber or inorganic substances into a phenolic resin. In the process of hot mulling in foundry applications, and that of kneading by hot roll in molding material production, phenolic resin is required to be solid in ambient temperature for processing. Therefore, both novolac type resin and solid resole type resin are used for this purpose.

Since a novolac type resin does not cure by itself by heating, generally a curing agent such as hexamethylene tetramine (hereinafter called "hexamine") is incorporated into said resin. However, when hexamine is incorporated as a curing agent, there is a drawback of contaminating the air of the work site, emitting toxic and disagreeable gases such as ammonia or amines by the crosslinking reaction of novolac type resin. When novolac type resin is used as a binder for molding material, ammonia or amines remaining in the cured article corrodes inserted metals, and this causes a drawback comprising an abnormal leakage of electricity and fracture of molded parts of mechanical equipment. On the contrary, resole type resins have a self-curing property when heated, have an advantage of being free of such emission of ammonia or amines at its curing or said damage of products. Accordingly, solid resole type resins have recently had several uses such as for foundries, refractories, molding material an so forth. However, solid resole type phenolic resin has the general drawback of slow rate of cure compared with novolac type resin cured with hexamine. The adjustment of the hexamine ratio to novolac type resin is generally easy with respect to the control of its degree of condensation. Also, hexamine is fast in its rate of cure of novolac type resin by heating. Compared with this, solid resole type resins must generally be kept lower in their degree of condensation so as to prevent gel formation in the reaction kettle during their preparation. Also, they are essentially slower in rate of cure than the novolac type resin with hexamine. To accelerate the rate of cure in the solid resole type phenolic resin, several additives are reported to be effective; hydroxide or oxide of magnesium, zinc or barium, bisphenol S or catechol (Japanese Patent Publication Sho No. 53-58430), reactive phenols such as resorcinol, or acids such as salicylic acid (Japanese Patent Publication Sho No. 54-28357). While these additives can accelerate the rate of cure in the initial and medium period for solid resole type resin, they cannot accelerate it at the terminating period (in practical applications). Heating solid resole type resin with these additives incorporated therein seems apparently to accelerate the cure of resin due to reaction with said additives after melting of the resin. A tighter crosslinking structure cannot be achieved by further heating of the resin composition since initial formation of a coarse crosslinking interrupts free movement of molecules necessary for the curing reaction thereafter, thereby reducing the opportunity for contact of functional groups.

Assuming that said resin composition at its terminating period of cure is lower in crosslinking density than said solid resole type phenolic resin alone, this explains the phenomenon that the accelerating rate of cure with said additives in solid resole type phenolic resin causes a drawback in mechanical strength and hardness of finally cured articles.

SUMMARY OF THE INVENTION

After much investigation to overcome said drawback, the inventors hereof have found that said rate of cure throughout the process is accelerated by incorporating 0.3 to 20 weight parts of a novolac type resorcinol resin obtained by reacting d 0.5 to 1 mole of aldehyde with 1 mole of resorcinol, into 100 weight percent of said solid resole type phenolic resin.

DESCRIPTION OF EMBODIMENTS

The solid resole type phenolic resin of the present invention is prepared by reacting phenols such as phenol, cresol or xylenol used jointly or alone, with aldehydes such as formaldehyde, paraformaldehyde, acetaldehyde or furfural used jointly or alone, in the presence of a basic catalysts such as aqueous ammonia, primary amines, secondary amines, tertiary amines or other amines, hydroxide or oxide of alkaline metals or alkaline earth metals such as sodium, potassium, zinc, barium or other basic catalysts used jointly or alone. 0.9 to 2.5 Moles of aldehydes are added to 1 mole of phenols, which are reacted by condensation in the presence of said basic catalysts, and dehydrating under vacuum to obtain said solid type resole resin.

The novolac type resorcinol resin of the present invention is prepared by reacting resorcinol alone or jointly with phenols, such as phenol, cresol, xylenol or bisphenol A, with aldehydes such as formaldehyde, paraformaldehyde, acetaldehyde or furfural used jointly or alone; with catalysts of organic or inorganic acids such as oxalic acid, formic acid, para-toluenesulfonic acid, hydrochloric acid or sulfuric acid used jointly or alone; alternately, with basic catalysts such as aqueous ammonia, primary amines, secondary amines, tertiary amines or other amines, hydroxides or oxides of alkaline metals or alkaline earth metals such as sodium, potassium, zinc, barium, or other basic catalysts used jointly or alone; and further by reacting in the absence of catalyst. When phenols are jointly used with 1 mole of resorcinol, 1 mole or less of phenol is preferably. 0.5 to 1 Mole of aldehyde is added to 1 mole of resorcinol, reacted in the presence of acid or basic catalysts or alternately in the absence of catalyst, dehydrated under vacuum to obtain said novolac type resorcinol resin.

The incorporation ratio of novolac type resorcinol resin into solid resole type phenolic resin is 0.3 to 20 weight parts of the former to 100 weight parts of the latter. If the incorporation ratio of novolac type resorcinol resin is less than 0.3 weight parts, hardly any remarkable acceleration effect of cure is obtained and if it is more than 20 weight parts, it reduces the flow of the composition during cure, thereby reducing the mechanical strength and hardness of the finally cured articles. Methods for incorporating novolac type resorcinol resin into resole type phenolic resin are exemplified by melting and mixing the former into the latter during the preparation of the latter, by mixing both resins in a pulverizer, kneader or mixer, or by mixing the former during the mixing process of the latter with fillers; however, any method for incorporating is satisfactory.

For foundry applications the resin composition of the invention is employed with foundry aggregate, such as sand, in the proportion of about 1 to about 5 parts by weight of resin composition based on 100 parts by weight of aggregate. For molding material applications, the resin composition of the invention is employed with fillers, such as described hereinbefore, in the proportion of about 30 to about 70 parts by weight of resin composition based on 100 parts by weight of molding material (resin plus fillers).

The solid resole type phenolic resin and novolac type resorcinol resin, not only can be accelerated in its curing reaction by the crosslinking reactivity of the latter to the former, but also the heat cured articles are higher in crosslinking density and are excellent in mechanical strength and hardness because of the said novolac type resorcinol resin is a prepolymer crosslinked by methylene bridges. By incorporating said conventinal additives into solid resole type phenolic resin, higher crosslinking will not be obtained in cured articles because the rate of cure for this resin composition is slower during the terminating period of cure while it is faster in the initial stage. On the other hand, the method according to the present invention comprising the incorporation of novolac type resorcinol resin into solid resole type phenolic resin successfully overcomes the drawbacks of the conventional art.

The present invention is further explained by the following nonlimitative Examples.

EXAMPLES

Example of resin preparation: Preparation of a novolac type resorcinol resin

To a reaction kettle having a stirrer, 1000 g of resorcinol, 300 g of water, 200 g of denatured ethanol and 1 g of para-toluenesulfonic acid as a catalyst were added. After the catalyst dissolved, the temperature of the reacting mixture was raised to about 80° C., and 553 g of 37%-formalin was added to it gradually so as no bumping occurred (Molar ratio of formaldehyde to resorcinol is 0.75). Keeping the temperature of the reaction mixture at about 80° C. for two hours to react resorcinol with formaldehyde, dehydrating under vacuum of 69 to 70 cmHg at 150° C. for about two hours and successive cooling, the product was discharged. The novolac type resorcinol resin thus obtained (hereinafter called "novolac type resorcinol resin A") was a brown solid at ambient temperature, its characteristics being such as 75° C. in melting point (capillary method) and 0.4% in moisture content.

EXAMPLE 1.

Cure characteristics obtained by the "CURELASTOMETER".

A representative sample of this invention (Sample 1) was prepared by incorporating 5 weight parts of novolac type resorcinol resin A into 100 weight parts of a commercially available solid resole type phenolic resin (molar ratio of formaldehyde to phenol is 1.6, prepared in the presence of sodium hydroxide and aqueous ammonia; hereinafter called "solid resole type phenolic resin B"). One Comparative Sample was the solid resole type phenolic resin B itself, and others were prepared by incorporating 5 weight parts of catechol, resorcinol, bisphenol S, and a conventional phenol-formaldehyde novolac resin, repectively, to said resin B. The rate of cure of said Sample 1 and the respective Comparative Samples were measured by the "CURELASTOMETER" is illustrated in FIG. 1.

The "CURELASTOMETER" is well-known within the industries concerned as a measure for evaluating the rate of cure of various resins and resin compositions.

In FIG. 1, Stress (ordinate), corresponds to the increase in rigidity of the resin as the curling reaction proceeds, also representing the crosslinking density of the resin. It is well-known to the industry concerned from past experience, that the most important practical cure characteristic fast cure is remarkedly represented in the graphs traced by said apparatus within the stress range of 5 Kg to 10 Kg.

Thus, in FIG. 1 stress initiation periods of resin compositions incorporating novolac type resorcinol resin A, catechol, resorcinol, and bisphenol S to solid resole type phenolic resin B are shorter than that of the solid resole type phenolic resin B alone (the period for the curves to reach 5 Kg of stress), and also the periods to achieve 8 Kg of stress becomes shorter in these cases. Namely, all said additive incorporated resins are better than the solid resole type phenolic resin B alone in the curing characteristics of initiation and middle period. In other words, all said additives promoted cure and above all, the novolac type resorcinol resin A proved to be most effective for these curing periods. As the heating continues further, stress reaches a maximum value due to the thermosetting reaction, which corresponds to the final crosslinking density of resin compositions. At this period, the resin mixture incorporating novolac type resorcinol resin A indicates higher stress, therefore higher crosslinking density than the solid resole type phenolic resin B alone. On the contrary, incorporating catechol, resorcinol nd bisphenol S indicate slower rate of cure as well as lower stress, therefore less crosslinking density for these periods than solid resole type phenolic resin B alone. On the other hand, in the case of solid resole type phenolic resin B alone, it indicates a more or less accelerated curing in these periods, however, it is inferior in cure in the preceeding period when compared with the resin mixture incorporating novolac type resorcinol resin A.

EXAMPLE 2

Test results obtained by shell mold resin coated sand.

A representative sample of this invention (Sample 2) was prepared by incorporating 5 weight parts of novolac type resorcinol resin A to 100 weight parts of solid resole type phenolic resin B. One Comparative Sample was the solid resole type phenolic resin B itself and others were prepared by incorporating 5 weight parts of cathechol, resorcinol, bisphenol S, and a conventional phenolformaldehyde novolac resin, respectively, to said resin B. Shell mold resin coated sand was prepared from these materials and practical properties measured respectively.

Incorporation Ratio

San-ei silica sand—100 weight parts
Solid resole type phenolic resin B—3
Additive—0.15
Water—1
Calcium stearate—0.1

Mulling Conditions

Silica sand was heated up to 130°–135° C. in a muller. Solid resole type phenolic resin B and additive if required are charged into said muller and mulled for about 40 seconds. After mulling was over, water and calcium stearate were added to the muller; thus shell molding resin coated sand was obtained.

D. Cure of bisphenol S incorporated resin B as Comparative Sample
E. Cure of resorcinol incorporated resin B as Comparative Sample.

TABLE 1

| Resin Additive | | Sample 2 Novolac type resorcinol resin A | Comparative Samples Solid resole type phenolic resin B | | | | Novolac type resin without resorcinol |
|---|---|---|---|---|---|---|---|
| | | | Catechol | Resorcinol | Bisphenol S | — | |
| Stick point °C. | | 99 | 98 | 96 | 97 | 96 | 98 |
| Bending strength KG/cm² | (200° C. 100 sec.) | 64.2 | 57.4 | 59.0 | 58.0 | 59.5 | 60.0 |
| Bending strength under heat Kg/cm² | 200° C., 40 sec. | 4.5 | 4.4 | 4.5 | 3.9 | 3.6 | 3.3 |
| | 200° C., 100 sec. | 9.5 | 7.2 | 7.1 | 6.7 | 7.5 | 6.5 |
| Bend | 200° C., 40 sec. | 2.94 | 4.05 | 4.13 | 3.96 | 4.58 | 5.23 |
| | 200° C., 100 sec. | 0.65 | 1.96 | 1.54 | 2.02 | 1.43 | 2.17 |

Table 1 clearly indicates that the resin mixture incorporating novolac type resorcinol resin A to solid resole type phenolic resin B is excellent in all characteristics such as bending strength, bending strength under heat, and bend as compared with the solid resole type phenolic resin alone, and mixtures incorporating other additives.

Specifications for the test methods in Table 1:
Bending strength: According to JACT Test Method SM-1.
Stick point: According to JACT Test Method C-1.
Bending strength under heat: According to JACT Test Method SM-10.
Bend: Coated sand is filled in a standard mold and treated under 200° C. for a required time. The specimen obtained is discharged 10 minutes thereafter, its stress distorted height measured under 500 g load.

Figure 1:
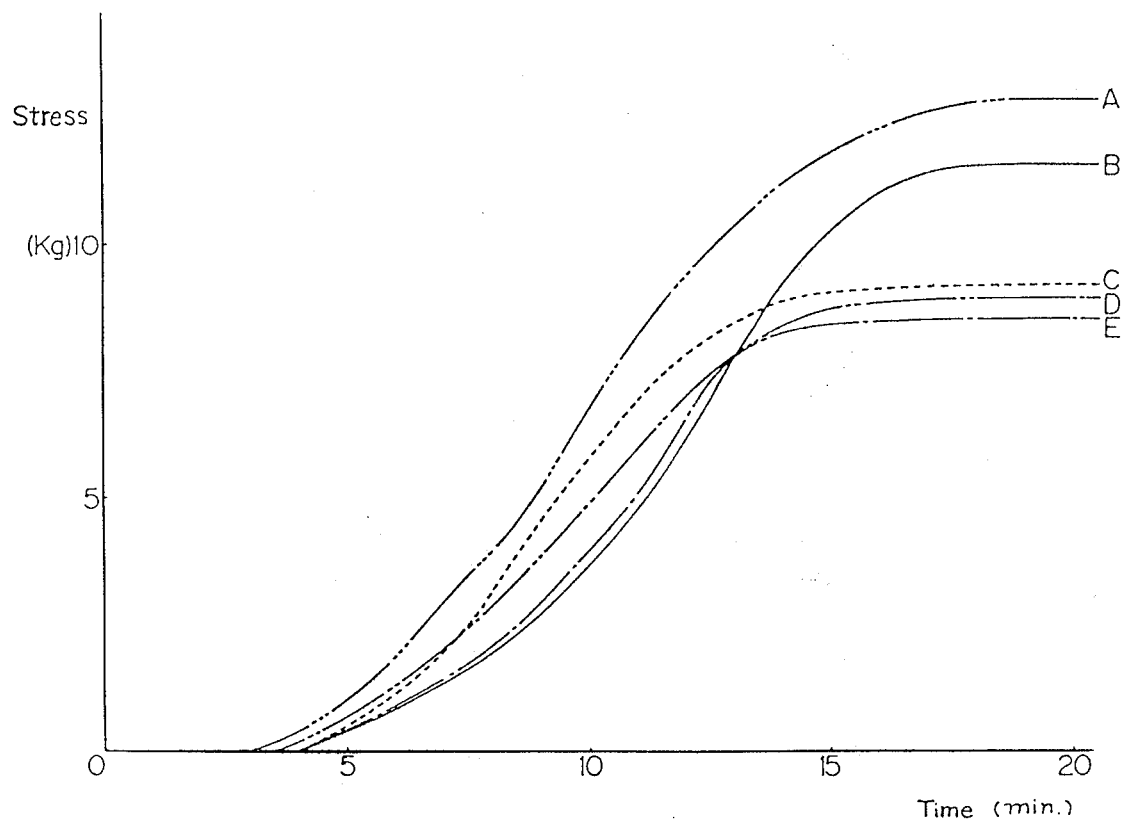
FIG. 1 illustrates the graphs representing the rate of cure obtained by JSR type "CURELASTOMETER" (testing conditions: temperature at 150° C., vibrating angle ±0.75°).
A. Cure of novolac type resorcinol resin A incorporated resin B (Sample 1).
B. Cure of solid resole type phenolic resin B alone as Comparative Sample.
C. Cure of catechol incorporated resin B as Comparative Sample.
F. Cure of resorcinol novolac resin as Comparative Sample.

We claim:
1. A resin composition comprising a phenol-aldehyde resole resin that is solid at ambient temperature, and about 0.3 to 20 parts by weight of a phenol-aldehyde novolac resin that is solid at ambient temperature based upon 100 parts by weight of said resole resin, wherein about 50 to 100 percent of the phenolic component of said novolac resin is resorcinol.

2. The composition of claim 1 wherein the aldehyde component of both the resole resin and the novolac resin is formaldehyde.

3. The composition of claim 2 wherein all of the phenolic component of said novolac resin is resorcinol, and the ratio of 0.5 to 1 mole of formaldehyde is employed per mole of resorcinol.

4. A foundry composition comprising a foundry aggregate and about 1 to about 5 parts by weight of the resin composition of claim 1, based on 100 parts by weight of aggregate.

5. The composition of claim 4 wherein the foundry composition comprises resin coated sand.

6. The process for preparing a foundry sand mold by heating at elevated temperatures the foundry composition of claim 1.

7. The process for preparing a foundry sand mold by heating at elevated temperatures the foundry composition of claim 5.

* * * * *